(12) United States Patent
Hu et al.

(10) Patent No.: US 12,396,593 B2
(45) Date of Patent: Aug. 26, 2025

(54) COOKING UTENSIL

(71) Applicant: ZHEJIANG NOVIA KITCHENWARE CO., LTD., Zhejiang (CN)

(72) Inventors: Huacheng Hu, Jinhua (CN); Chengzhou Zhang, Jinhua (CN); Jinzhi Ye, Jinhua (CN)

(73) Assignee: ZHEJIANG NOVIA KITCHENWARE CO., LTD., Jinhua (CN)

( * ) Notice: Subject to any disclaimer, the term of this patent is extended or adjusted under 35 U.S.C. 154(b) by 0 days.

(21) Appl. No.: 19/007,417

(22) Filed: Dec. 31, 2024

(65) Prior Publication Data
US 2025/0248565 A1   Aug. 7, 2025

(30) Foreign Application Priority Data

Feb. 4, 2024   (CN) .......................... 202420268219.9

(51) Int. Cl.
A47J 37/10   (2006.01)
(52) U.S. Cl.
CPC ........... *A47J 37/108* (2013.01); *A47J 37/101* (2013.01)
(58) Field of Classification Search
CPC ........ A47J 37/108; A47J 37/101; A47J 37/10; B65D 51/24; Y10S 220/912

USPC ........ 220/573.2, 573.1, 912, 753, 771, 752, 220/212.5, 212; 99/349, 351
See application file for complete search history.

(56) References Cited

U.S. PATENT DOCUMENTS

| | | | | |
|---|---|---|---|---|
| 1,032,212 | A * | 7/1912 | Hilton | B65F 1/1615 366/248 |
| 1,897,899 | A * | 2/1933 | Gleason | A47J 27/20 99/351 |
| 4,702,159 | A * | 10/1987 | Polster | A47J 37/0611 99/422 |
| 11,841,146 | B2 * | 12/2023 | Xu | A47J 36/32 |

FOREIGN PATENT DOCUMENTS

| | | | | |
|---|---|---|---|---|
| CA | 2813164 A1 * | 2/2012 | | A47J 36/38 |
| CN | 116322440 A | 6/2023 | | |

\* cited by examiner

*Primary Examiner* — Robert J Hicks
(74) *Attorney, Agent, or Firm* — Mei & Mark LLP; Manni Li

(57) ABSTRACT

A cooking utensil comprises a pot body, a handle, and a cover body capable of covering an opening of the pot body, where the handle is arranged on a side of the pot body. A cover pressing plate capable of covering food inside the pot body is arranged, and a lifting pressure rod capable of compressing the cover pressing plate when descending is arranged on the cover body. The cooking utensil is applicable to cooking various thicknesses of food and is capable of effectively controlling pressure applied to the food according to cooking needs.

9 Claims, 4 Drawing Sheets

COOKING UTENSIL

CROSS-REFERENCE TO RELATED APPLICATION

The subject application claims priority on Chinese Patent Application No. CN202420268219.9 filed on Feb. 4, 2024 in China. The contents and subject matters of the Chinese priority application are incorporated herein by reference.

TECHNICAL FIELD

The present invention relates to cooking utensils such as pots, and in particular to a cooking utensil.

BACKGROUND ART

When a conventional cooking utensil is used for frying or sauteing food, hot oil easily splatters. Moreover, when frying or sauteing thick food like steak, a user not only has to endure the splattering of hot oil, but also needs to press the food with a spatula to ensure full heating, which poses a challenge to the user.

To solve the above problems, Chinese patent application CN116322440A discloses a multi-purpose cooking appliance with a pressing plate. The cooking appliance comprises a cooking container, and the cooking container comprises a body, a lid, a handle, and a fixing device. A cooking space that opens upwards is formed in the body to cook food inside, the lid is configured for sealing the cooking space, the handle is arranged on a side of the body for easily gripping the body, and the fixing device is configured for connecting the lid to the body. A pressing plate is further arranged, and the pressing plate elastically supports the bottom surface of the lid when the lid is placed on food located on a bottom surface of the cooking space of the body to gently press the food with the help of elasticity. According to the technical solution in the Chinese patent application, the pressing plate and the lid are combined to prevent hot oil splattering, and an elastic member on the pressing plate and the lid are used to press the food for full and even heating in the cooking process. However, the technical solution is relatively effective for thick food rather than thin food and does not apply to various thicknesses of food. Moreover, only through the elastic member on the pressing plate, pressure applied to the food according to cooking needs cannot be effectively controlled.

SUMMARY OF THE INVENTION

In order to solve the problems in the existing technology, an objective of the present invention is to provide a cooking utensil. The cooking utensil is applicable to cooking various thicknesses of food and is capable of effectively controlling pressure applied to the food according to cooking needs.

In order to achieve the above objective, the present invention provides a technical solution as follows:

A cooking utensil, comprising a pot body, a handle, and a cover body capable of covering an opening of the pot body, where the handle is arranged on a side of the pot body; and a cover pressing plate capable of covering food inside the pot body is arranged, and a lifting pressure rod capable of compressing the cover pressing plate when descending is arranged on the cover body.

In the cooking utensil of the present invention, the lifting pressure rod comprises a rotating operating part and a rotating rod connected to the rotating operating part, and the rotating rod is provided with an external thread; and the cover body is provided with a through hole, a hollow connecting piece is arranged in the through hole, the connecting piece is provided with an internal thread, and the rotating rod, through the external thread, is connected to the internal thread of the connecting piece in a threaded manner.

In the cooking utensil of the present invention, a rotating rod accommodating part is arranged at a position where the cover pressing plate corresponds to the through hole.

In the cooking utensil of the present invention, the rotating rod accommodating part is an elastic component.

In the cooking utensil of the present invention, the rotating operating part is a rocking handle arranged to be perpendicular to the rotating rod.

In the cooking utensil of the present invention, the lower end of the rotating rod is not connected to the rotating rod accommodating part.

In the cooking utensil of the present invention, the rotating rod accommodating part is in the shape of a hollow cone, and an outer diameter thereof gradually decreases from an upper end to a lower end; and an outer diameter of an upper end of the rotating rod accommodating part is greater than that of the lower end of the rotating rod.

In the cooking utensil of the present invention, the rotating rod accommodating part comprises a hollow conical cylinder and a soft sealing cover; the hollow conical cylinder and the cover pressing plate are integrally formed, and the soft sealing cover connects and seals an upper end of the hollow conical cylinder; and an upper end surface of the soft sealing cover is in contact with the lower end of the rotating rod.

In the cooking utensil of the present invention, annular pot ears are arranged on both sides of an upper edge of the pot body, and snap-in feet that protrude from the cover body and can be snap-fitted into annular openings of the annular pot ears are arranged on both sides of the cover body correspondingly.

In the cooking utensil of the present invention, the annular pot ears are arranged on a side of the pot body away from the handle, and the snap-in feet that protrude from the cover body and can be snap-fitted into the annular openings of the annular pot ears are arranged on a side where the cover body corresponds to the pot ears; and one end of the handle connected to the pot body is provided with a snap-in stop mechanism capable of locking an edge of the cover body in a snap-in manner; and the snap-in stop mechanism comprises a snap-in stop sheet, a spring, and a switch; and a mounting groove is formed in an end portion of the handle, a mounting hole is formed in the mounting groove, the snap-in stop sheet and the spring are arranged in the mounting groove, one end of the snap-in stop sheet, through the mounting hole, extends out of the end portion of the handle, the other end thereof abuts against the spring, and the switch covers the mounting groove and is connected with the snap-in stop sheet to control the snap-in stop sheet to lock or release the edge of the cover body.

According to the above technical features, the present invention has the following advantages:

1. The lifting pressure rod on the cover body of the cooking utensil is applicable to cooking different thicknesses of food.
2. The lifting pressure rod on the cover body of the cooking utensil enables to adjust pressure applied by the cover pressing plate on the food as needed.

3. The rotating rod of the lifting pressure rod on the cover body of the cooking utensil is threadedly connected to the connecting piece, which enables to adjust the pressure applied by the cover pressing plate on the food more finely.
4. The pot ears and the snap-in feet of the cover body of the cooking utensil are designed to ensure when the lifting pressure rod works, the cover body remains fixed to the pot body, the cover body will not bounce off due to a reaction force, and the cover body is placed and removed in a very convenient manner.
5. The cover pressing plate of the present invention is independently arranged, which can be placed inside the pot body according to cooking needs or placed outside the pot body in a flexible and convenient manner.
6. The rotating rod accommodating part on the cover pressing plate is further provided with a balanced pressure transmission structure to transmit the pressure from the lifting pressure rod to a bottom of the cover pressing plate in a dispersed and balanced manner.

DETAILED DESCRIPTION OF THE INVENTION

The present invention is described in detail through specific examples. It should be noted that the following examples are merely further explanations of the present invention and should not be construed as a limitation on the protection scope of the present invention. Some non-essential improvements and adjustments made by those skilled in the art according to the content of the present invention still fall within the protection scope of the present invention.

Figure 1:
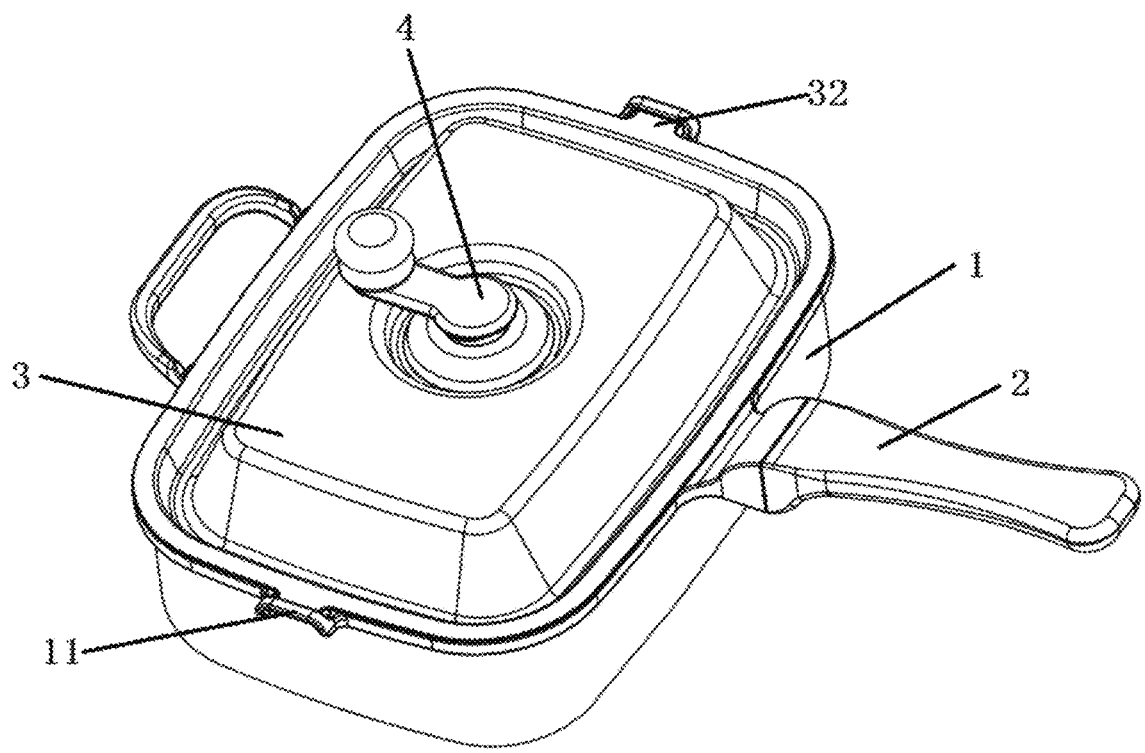
FIG. 1 is a structural schematic diagram of Example 1 of the present invention.
Figure 2:
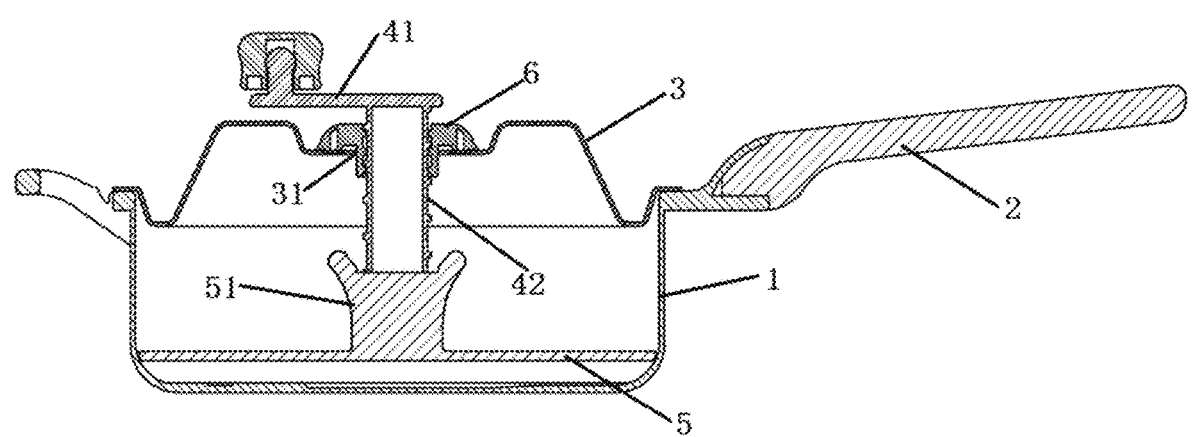
FIG. 2 is a structural sectional view of Example 1 of the present invention.

A cooking utensil, as illustrated in FIGS. 1-6, comprises a pot body 1, a handle 2, and a cover body 3 capable of covering an opening of the pot body 1, where the handle 2 is arranged on a side of the pot body 1. As illustrated in FIG. 2, a cover pressing plate 5 capable of covering food inside the pot body 1 is further arranged, and a lifting pressure rod 4 capable of compressing the cover pressing plate 5 when descending is arranged on the cover body 3. The cover pressing plate 5 is not always placed inside the pot body 1 but is placed inside the pot body 1 as needed for cooking, and the cover pressing plate 5 is independently arranged, which can be placed inside the pot body 1 according to cooking needs or placed outside the pot body 1 in a flexible and convenient manner.

As illustrated in FIG. 2, the lifting pressure rod 4 comprises a rotating operating part and a rotating rod 42 connected to the rotating operating part, and preferably, the rotating operating part is a rocking handle 41 arranged to be perpendicular to the rotating rod 42.

Figure 3:
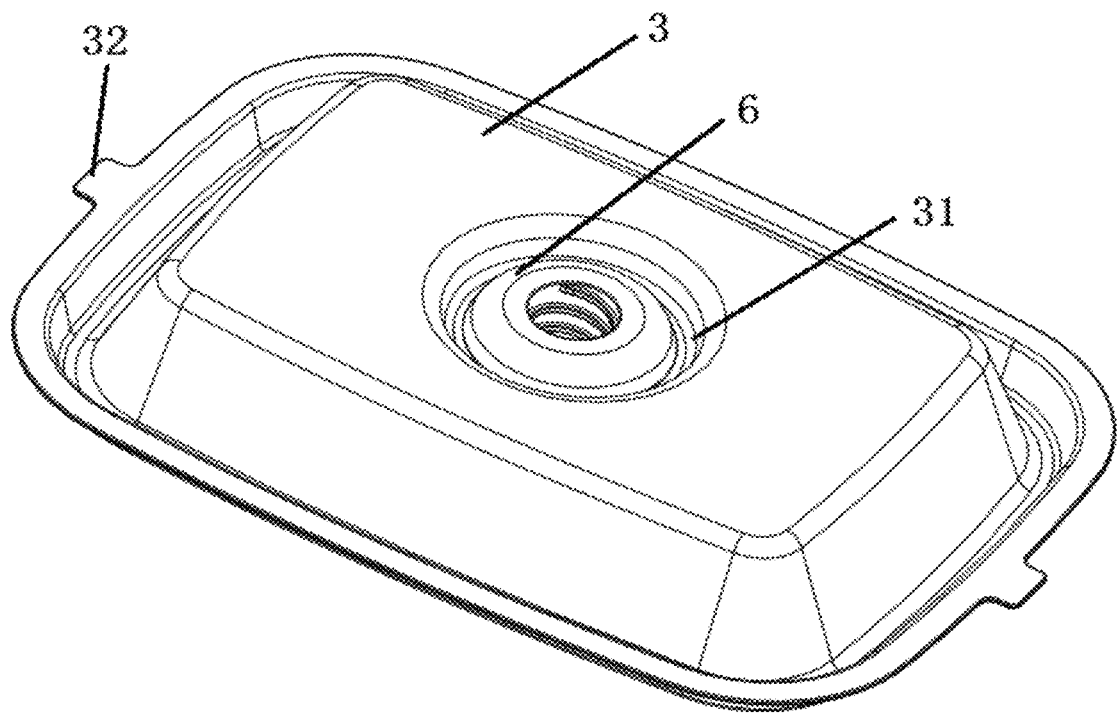
FIG. 3 is a structural schematic diagram of a cover body according to Example 1 of the present invention.

Further, the rotating rod 42 is provided with an external thread; and as illustrated in FIG. 3, the cover body 3 is provided with a through hole 31, a hollow connecting piece 6 is arranged in the through hole 31, the connecting piece 6 is provided with an internal thread, the rotating rod 42, through the external thread, is connected to the internal thread of the connecting piece 6 in a threaded manner, and the lifting pressure rod 4 is capable of spiraling up or down on the cover body 3, such that pressure on the cover pressing plate 5 can be adjusted more finely.

Figure 4:
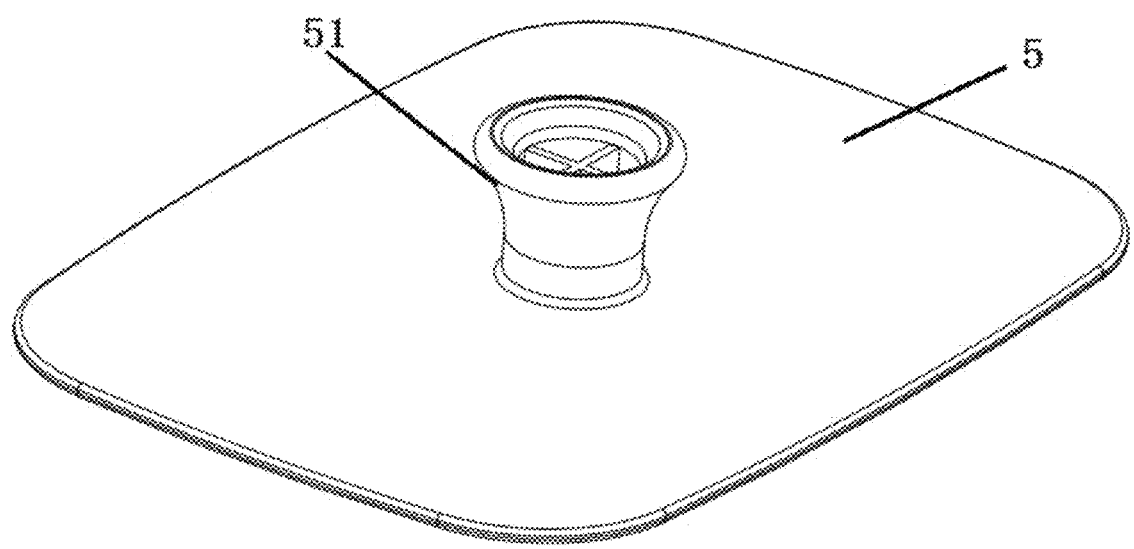
FIG. 4 is a structural schematic diagram of a cover pressing plate according to Example 1 of the present invention.

As illustrated in FIG. 4, a rotating rod accommodating part 51 is arranged at a position where the cover pressing plate 5 corresponds to the through hole 31. When the lifting pressure rod 4 descends, the bottom of the rotating rod 42 presses against the rotating rod accommodating part 51, such that pressure is transmitted downwards.

Preferably, the rotating rod accommodating part 51 is an elastic component, such that a cushioning effect can be achieved when the lifting pressure rod 4 descends too much, where the elastic component can be made of a silica gel material.

In Example 1, as illustrated in FIG. 1, annular pot ears 11 are arranged on both sides of an upper edge of the pot body 1, and snap-in feet 32 that protrude from the cover body 3 and can be snap-fitted into annular openings of the annular pot ears 11 are arranged on both sides of the cover body 3 correspondingly.

Before sauteing or frying food, the cover pressing plate 5 is placed on the food inside the pot body 1, then the cover body 3 is put in place, and the snap-in feet 32 are snap-fitted into the pot ears 11 to fix the cover body 3 on the opening of the pot body 1. The rocking handle 41 is rotated to descend the rotating rod 42, the cover pressing plate 5 is pressed downwards due to pressure on the rotating rod accommodating part 51, and since the snap-in feet 32 are snap-fitted into the pot ears 11, the cover body 3 will not bounce off due to a reaction force. The rocking handle 41 is operated such that the rotating rod 42 gradually transmits pressure to the cover pressing plate 5, and a descent distance of the lifting pressure rod 4 can be adjusted based on the thickness of food.

Figure 5:
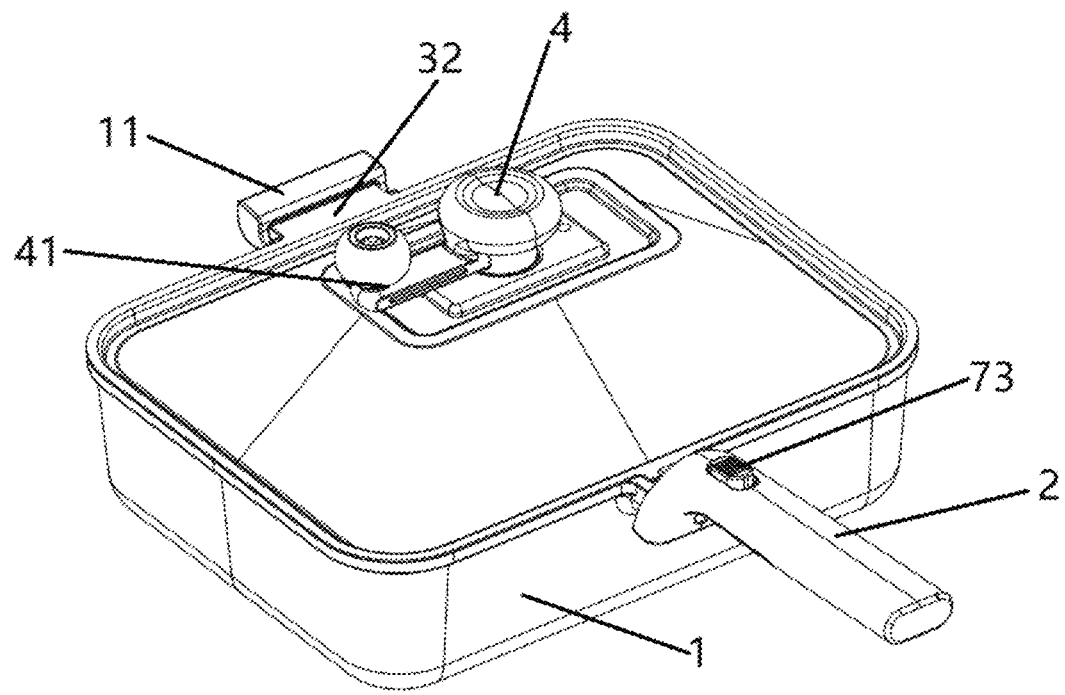
FIG. 5 is a structural schematic diagram of Example 2 of the present invention.
Figure 6:
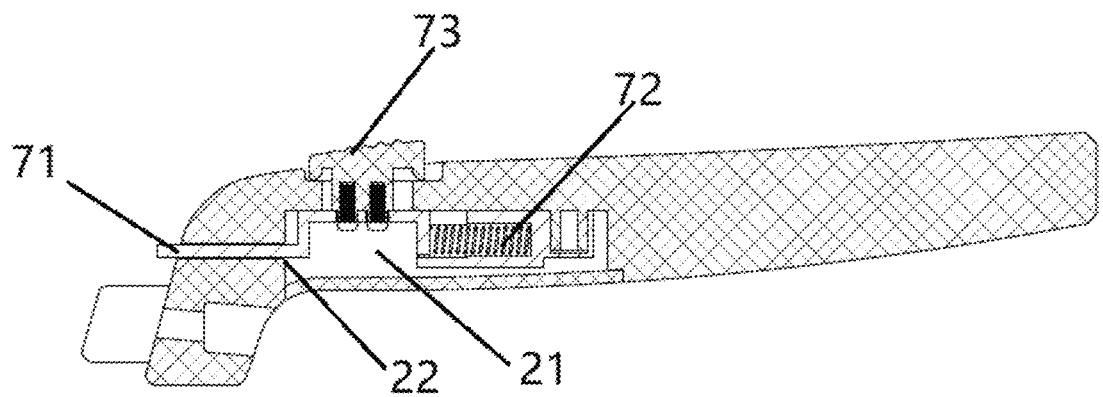
FIG. 6 is a structural sectional view of a handle according to Example 2 of the present invention.

In Example 2, as illustrated in FIGS. 5 and 6, the annular pot ears 11 are arranged on a side of the pot body 1 away from the handle 2, and the snap-in feet 32 that protrude from the cover body 3 and can be snap-fitted into the annular openings of the annular pot ears 11 are arranged on a side where the cover body 3 corresponds to the pot ears 11; and one end of the handle 2 connected to the pot body 1 is provided with a snap-in stop mechanism capable of locking an edge of the cover body 3 in a snap-in manner. The snap-in stop mechanism comprises a snap-in stop sheet 71, a spring 72, and a switch 73; and a mounting groove 21 is formed in an end portion of the handle 2, a mounting hole 22 is formed in the mounting groove 21, the snap-in stop sheet 71 and the spring 72 are arranged in the mounting groove 21, one end of the snap-in stop sheet 71, through the mounting hole 22, extends out of the end portion of the handle 2, the other end thereof abuts against the spring 72, and the switch 73 covers the mounting groove 21 and is connected with the snap-in stop sheet 71 to control the snap-in stop sheet 71 to lock or release the edge of the cover body 3.

In use, when the spring 72 is compressed by sliding the switch 73, the snap-in stop sheet 71 can retract into the mounting hole 22, and in this case, the snap-in stop mechanism releases the edge of the cover body 3 on this side. When the spring 72 releases an elastic force, the snap-in stop sheet 71 extends out of the mounting hole 22 and locks the edge of the cover body 3, and at the same time, the switch 73 is also reset accordingly.

Figure 7:
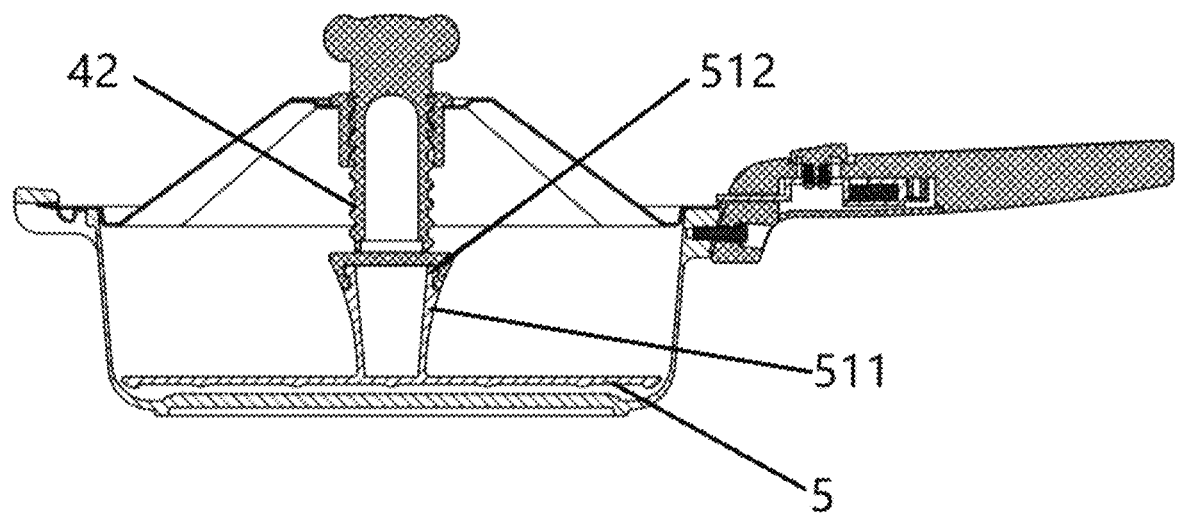
FIG. 7 is a structural sectional view of Example 3 of the present invention.
Figure 8:
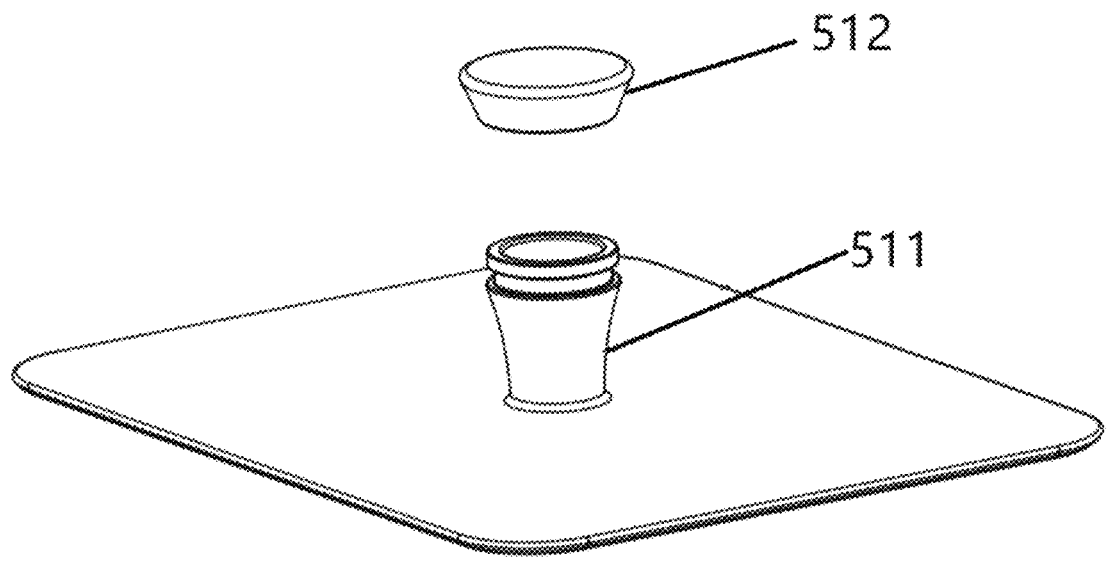
FIG. 8 is a structural schematic diagram of a cover pressing plate according to Example 3 of the present invention.

In Example 3, as illustrated in FIGS. 7 and 8, the cover pressing plate 5 with a balanced pressure transmission structure is disclosed. The cover pressing plate 5 is not connected to the lifting pressure rod 4. Specifically, the cover pressing plate 5 is provided with the rotating rod accommodating part 51, and a lower end of the rotating rod 42 of the lifting pressure rod 4 is not connected to the rotating rod accommodating part 51. The rotating rod accommodating part 51 is in the shape of a hollow cone, and an outer diameter thereof gradually decreases from an upper end to a lower end; and an outer diameter of the upper end of the rotating rod accommodating part 51 is greater than that of the lower end of the rotating rod 42.

In use, when the lower end of the rotating rod 42 applies pressure to the upper end of the rotating rod accommodating part 51, the pressure is balanced through the hollow cone and transmitted to a bottom end of the cover pressing plate 5 in a dispersed manner. Even if the cover pressing plate 5 covering food, due to a special shape of the food, maybe is not in a horizontal state inside the pot body 1, the pressure applied by the lower end of the rotating rod 42 can be appropriately balanced and transmitted to the bottom end of the cover pressing plate 5 through the rotating rod accommodating part 51 of the hollow cone shape.

Further, the rotating rod accommodating part 51 comprises a hollow conical cylinder 511 and a soft sealing cover 512; the hollow conical cylinder 511 and the cover pressing plate 5 are integrally formed, and the soft sealing cover 512 connects and seals an upper end of the hollow conical cylinder 511; and an upper end surface of the soft sealing cover 512 is in contact with the lower end of the rotating rod 42. When the soft sealing cover 512 does not work due to wear, a user only needs to replace this component, without needing to replace the entire cover pressing plate 5 with a new one bought. As illustrated in FIG. 8, the replaceable soft sealing cover 512 is a cover of the hollow conical shape with a closed upper end and an open lower end, and an inner wall of the lower end thereof is provided with a circle of snap-fit edges that correspond to a circle of snap-in grooves on an outer edge of an upper section of the hollow conical cylinder 511.

The foregoing descriptions are merely preferred examples of the present invention and are not intended to limit the scope of protection of the present invention. That is to say, all equivalent changes and modifications made based on the contents of the patentable scope of the present invention shall fall within the technical scope of the present invention.

We claim:

1. A cooking utensil, comprising
a pot body (1),
a handle (2),
a cover body (3) capable of covering an opening of the pot body (1),
wherein the handle (2) is arranged on a side of the pot body (1); and
a cover pressing plate (5) capable of covering food inside the pot body (1) is arranged, and a lifting pressure rod (4) capable of compressing the cover pressing plate (5) when descending is arranged on the cover body (3),
the lifting pressure rod (4) comprises a rotating operating part and a rotating rod (42) connected to the rotating operating part, and the rotating rod (42) is provided with an external thread; and
the cover body (3) is provided with a through hole (31), a hollow connecting piece (6) is arranged in the through hole (31), the connecting piece (6) is provided with an internal thread, and the rotating rod (42), through the external thread, is connected to the internal thread of the connecting piece (6) in a threaded manner.

2. The cooking utensil according to claim 1, wherein a rotating rod accommodating part (51) is arranged at a position where the cover pressing plate (5) corresponds to the through hole (31).

3. The cooking utensil according to claim 2, wherein the rotating rod accommodating part (51) is an elastic component.

4. The cooking utensil according to claim 3, wherein a lower end of the rotating rod (42) is not connected to the rotating rod accommodating part (51).

5. The cooking utensil according to claim 4, wherein the rotating rod accommodating part (51) is in the shape of a hollow cone, and an outer diameter thereof gradually decreases from an upper end to a lower end; and
an outer diameter of an upper end of the rotating rod accommodating part (51) is greater than that of the lower end of the rotating rod (42).

6. The cooking utensil according to claim 5, wherein the rotating rod accommodating part (51) comprises a hollow conical cylinder (511) and a soft sealing cover (512);
the hollow conical cylinder (511) and the cover pressing plate (5) are integrally formed, and the soft sealing cover (512) connects and seals an upper end of the hollow conical cylinder (511); and
an upper end surface of the soft sealing cover (512) is in contact with the lower end of the rotating rod (42).

7. The cooking utensil according to claim 1, wherein the rotating operating part is a rocking handle (41) arranged to be perpendicular to the rotating rod (42).

8. The cooking utensil according to claim 1, wherein annular pot ears (11) are arranged on both sides of an upper edge of the pot body (1), and snap-in feet (32) that protrudes from the cover body (3) and is snap-fitted into annular openings of the annular pot ears (11) are arranged on both sides of the cover body (3) correspondingly.

9. The cooking utensil according to claim 8, wherein the annular pot ears (11) are arranged on a side of the pot body (1) away from the handle (2), and the snap-in feet (32) that protrude from the cover body (3) and can be snap-fitted into the annular openings of the annular pot ears (11) are arranged on a side where the cover body (3) corresponds to the pot ears (11);
and one end of the handle (2) connected to the pot body (1) is provided with a snap-in stop mechanism capable of locking an edge of the cover body (3) in a snap-in manner;
and the snap-in stop mechanism comprises a snap-in stop sheet (71), a spring (72), and a switch (73);
and a mounting groove (21) is formed in an end portion of the handle (2), a mounting hole (22) is formed in the mounting groove (21), the snap-in stop sheet (71) and the spring (72) are arranged in the mounting groove (21), one end of the snap-in stop sheet (71), through the mounting hole (22), extends out of the end portion of the handle (2), the other end thereof abuts against the spring (72), and the switch (73) covers the mounting groove (21) and is connected with the snap-in stop sheet (71) to control the snap-in stop sheet (71) to lock or release the edge of the cover body (3).

\* \* \* \* \*